US008663014B2

(12) United States Patent
Xu et al.

(10) Patent No.: US 8,663,014 B2
(45) Date of Patent: Mar. 4, 2014

(54) APPARATUS AND METHOD WITH PHYSICAL LOCATION CHECK-IN THAT TRIGGERS A STATUS CHANGE IN A VIRTUAL GAME

(75) Inventors: Minglei Xu, Palo Alto, CA (US); Puneet Chhabra, Mountain View, CA (US); Heidi Kay Carson, Cupertino, CA (US); Tanya Yin Wa Buell, Mountain View, CA (US); Christopher Michael Kirmse, Mountain View, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/352,243

(22) Filed: Jan. 17, 2012

(65) Prior Publication Data

US 2012/0196682 A1 Aug. 2, 2012

Related U.S. Application Data

(60) Provisional application No. 61/438,118, filed on Jan. 31, 2011.

(51) Int. Cl.
*A63F 13/12* (2006.01)

(52) U.S. Cl.
USPC .................................. 463/42; 463/9; 700/92

(58) Field of Classification Search
USPC ............ 463/9, 30–34, 40–42, 37, 39; 706/45; 700/91, 92
See application file for complete search history.

(56) References Cited

U.S. PATENT DOCUMENTS 7,593,740 B2 9/2009 Crowley et al.
7,809,805 B2 10/2010 Stremel et al.
2004/0092311 A1* 5/2004 Weston et al. .................. 463/42
2006/0270419 A1* 11/2006 Crowley et al. ............ 455/456.2
2007/0099705 A1* 5/2007 Tanz ................................ 463/42
2007/0225070 A1* 9/2007 Zahorik et al. ................. 463/29
2008/0146338 A1* 6/2008 Bernard et al. ................. 463/42
2009/0017913 A1* 1/2009 Bell et al. ........................ 463/40
2009/0098939 A1* 4/2009 Hamilton et al. ............... 463/42
2009/0215469 A1* 8/2009 Fisher et al. ............... 455/456.3
2010/0093438 A1* 4/2010 Baszucki et al. ................ 463/42
2012/0094763 A1* 4/2012 Khan ............................... 463/42

OTHER PUBLICATIONS

Nightclub City video game, Nightclub City Walkthrough Cheats and Strategy Guide, http://www.gamezebo.com/games/nightclub-city/walkthrough-cheats-strategy-guide, May 5, 2010.*
Jordan, "Zynga Launches Its First Mobile Game with Location-based Elements, Dream Zoo Walkabout to Unlock Free Safaris", http://www.pocketgamer.biz/r/PG.Biz/Dream+Zoo/news.asp?c=35487, Nov. 23, 2011, 1 pg.
Siegler, "Life Is Crime: If You Try to Shakedown My Virtual TechCrunch Office, I Will Virtually Beat You Down", http://techcrunch.com/2011/08/26/life-is-crime, Aug. 26, 2011, 3 pgs.
Takahashi, "Booyah Reinvents Itself and the Pets Genre with Pet Town", http://venturebeat.com/2012/01/19/booyah-reinvents-itself-and-the-pets-genre-with-pet-town, Jan. 19, 2012, 2 pgs.

* cited by examiner

*Primary Examiner* — Damon Pierce
(74) *Attorney, Agent, or Firm* — Schwegman, Lundberg & Woessner, P.A.

(57) ABSTRACT

A computer readable storage medium includes executable instructions to receive a check-in indication from a physical location with a corresponding virtual location in a virtual game. An attribute in the virtual game is altered based upon the check-in indication. The attribute may be earned points for a user, a virtual object earned by a user or an enhanced popularity measure for the virtual location.

20 Claims, 7 Drawing Sheets

APPARATUS AND METHOD WITH PHYSICAL LOCATION CHECK-IN THAT TRIGGERS A STATUS CHANGE IN A VIRTUAL GAME

CROSS-REFERENCE TO RELATED APPLICATION

This application claims priority to U.S. Provisional Patent Application 61/438,118, filed Jan. 31, 2011, the contents of which are incorporated herein by reference.

FIELD OF THE INVENTION

This invention relates generally to games in network environments. More particularly, this invention includes utilizing physical location check-in to trigger a status change in a virtual game.

BACKGROUND OF THE INVENTION

Location-based services are increasingly popular with Internet-connected mobile devices (e.g., smart-phones, tablets and MP3 devices). Many social networking services allow users to "check-in" to physical places and share their locations with friends. Usually, the mobile application will use the device's GPS or WiFi to determine the user's current location. Based on this location information, the application's server software may supply a list of nearby places (or venues) to which the users can check-in.

One of the most compelling incentives for users to check-in is to receive deals from local merchants. For example, a user may be awarded with points upon checking-in to a venue. Then the local merchants can offer special deals to users with a threshold number of points.

There are shortcomings associated with the check-in operation. Many users find a check-in operation to be too much work and too little fun. The work comes from the users physically going to a place to check-in. The amount of fun associated with a check-in largely depends on the quality of deals that can be unlocked at a venue. It is hard to maintain a user's interest when the same deals are offered repeatedly.

In view of the foregoing, it would be desirable to provide new techniques for enhancing check-in operations associated with mobile devices.

SUMMARY OF THE INVENTION

A computer readable storage medium includes executable instructions to receive a check-in indication from a physical location with a corresponding virtual location in a virtual game. An attribute in the virtual game is altered based upon the check-in indication. The attribute may be earned points for a user, a virtual object earned by a user or an enhanced popularity measure for the virtual location.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
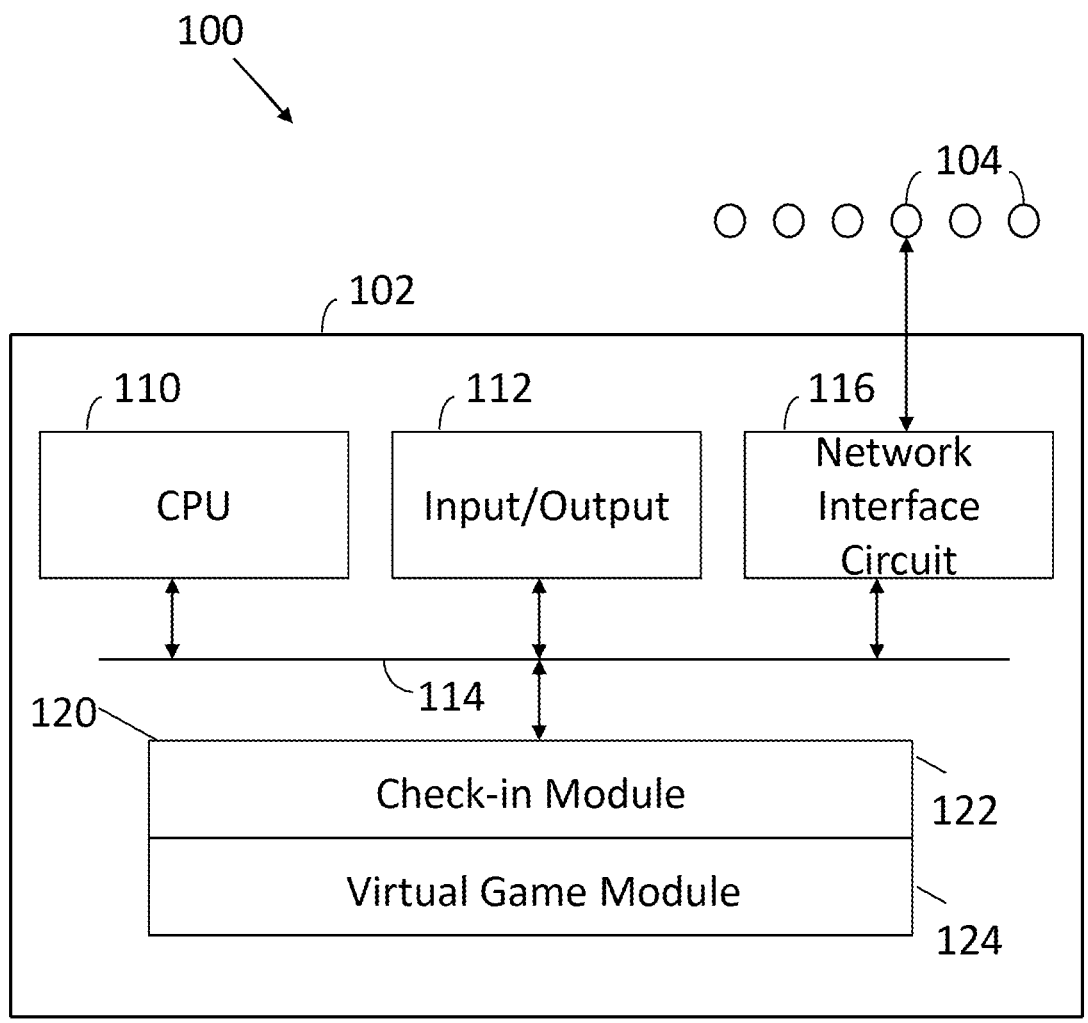
FIG. 1 illustrates a system configured in accordance with an embodiment of the invention.

FIG. 1 illustrates a system 100 configured in accordance with an embodiment of the disclosed technology. The system 100 includes at least one server computer 102 in communication with a plurality of client devices 104 operative in a networked environment. The server computer 102 includes components, such as a central processing unit 110 in communication with a set of input/output devices 112 over a bus 114. The input/output devices 112 may include a keyboard, mouse, display and the like. A network interface circuit 116 is also connected to the bus 114 to provide networked communications with client devices 104. Each client device 104 includes components, such as a central processing unit, input/output devices, a network interface circuit, and a memory with executable instructions, such as a browser. The client device 104 may be a computer, a handheld mobile, a tablet, a personal digital assistant and the like. While the invention may be implemented in various architectures, at least one embodiment contemplates the use of client devices 104 in the form of wireless mobile devices that communicate with the server 102 via a wireless network (not shown).

A memory 120 is also connected to the bus 114. The memory 120 stores executable instructions to implement operations of the disclosed technology. For example, the memory 120 stores a check-in module 122. The check-in module 122 includes executable instructions to process check-in data. For example, a physical world check-in is received in the form of a user identification and a physical location identification. The physical location identification may be in many forms. In one embodiment, physical location coordinates are supplied from a Global Positioning System (GPS) chip of a mobile device. Alternately, physical location coordinates associated with a WiFi device at the physical location may be supplied. In another embodiment, a text message with location information is received. In one embodiment, the check-in module 122 generates an index specifying a user name, physical location, and a time stamp.

The memory 120 also stores a virtual game module 124. The virtual game module 124 includes executable instructions to implement a virtual game with at least some virtual game elements that correspond to the physical world. For example, the virtual game may be set in a town and one or more actual establishments in the town may be incorporated as virtual locations in the virtual town. Alternately, the virtual game may be set at a school and one or more buildings at the school may be incorporated as virtual locations in the virtual school. Social games, role playing games, puzzle solving games and strategy games may incorporate the location based feature of the disclosed technology.

The check-in module 122 receives from a user a check-in indication at a physical location corresponding to a virtual location in a virtual game. The virtual game module 124 communicates with the check-in module for updates. A virtual game status change transpires based upon a physical check-in. For example, a user attribute may be altered. The attribute may be earned points or a virtual object. The status change may be for the virtual location, which through the check-in receives an enhanced popularity ranking In one embodiment, each virtual venue is mapped to a virtual item or a list of virtual items, which are unlocked by the user through the check-in process.

The virtual game module tracks user attributes, including a network of friends. In one embodiment, when a user performs a check-in at a physical location, the user operates as a physical location liberator, which enables the network of friends to access released virtual goods at the virtual location without a physical location check-in.

Thus, the invention provides game play around location and social sharing on mobile devices. A check-in to a real world physical location is used to unlock in-game virtual resources. Thus, game play is driven by social mechanics and a virtual economy. Thus, new motivations are provided to perform physical check-in operations.

Figure 2:
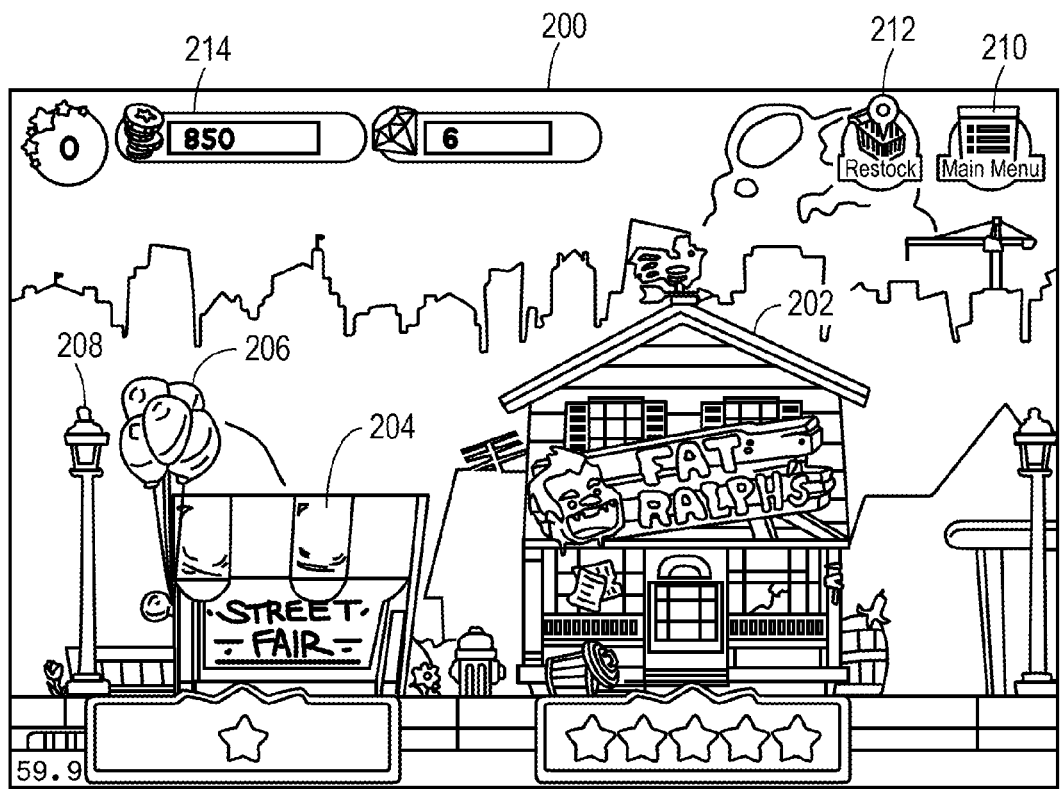
FIGS. 2-6 illustrate graphical user interfaces that may be utilized to implement operations of the invention.

FIG. 2 illustrates a graphical user interface (GUI) 200 displaying a virtual town, including an establishment called "Fat Ralph's" 202, which may correspond to an actual physical establishment. The virtual town includes additional virtual items such as shop 204, balloons 206 and light post 208. A main menu icon 210 is also provided. One or more scoring mechanisms 214 may also be provided. In this embodiment, a restock icon 212 is also provided. Selection of the restock icon 212 leads a player to a screen to secure virtual items, such as shown in FIG. 3.

Figure 3:
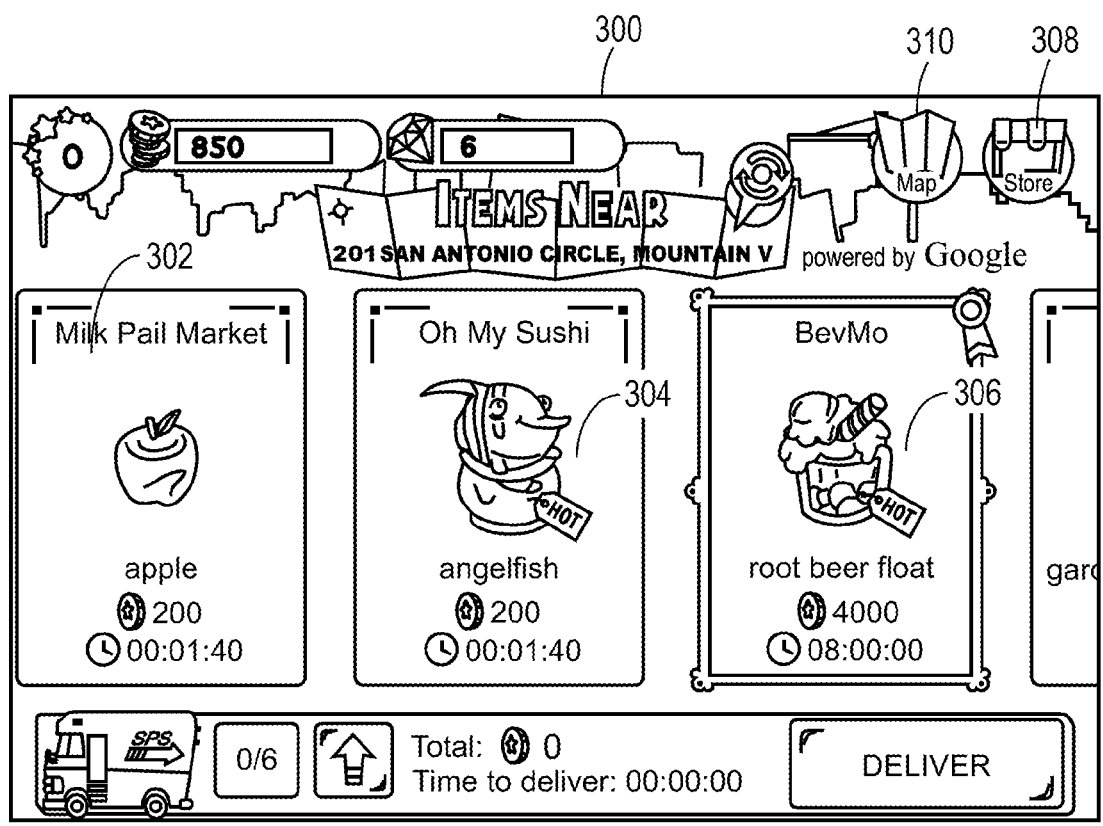

FIG. 3 illustrates a GUI 300 listing establishments 302, 304 and 306 near the user. The establishments may be ordered by proximity, popularity, category or paid placement. In the case of proximity, a list of nearby places for check-ins is fetched based upon player physical location. Establishment popularity may be based upon the number of check-ins. A recursive calculation may be used such that users gain popularity if they visit popular places and places gain popularity if popular users visit them.

Category placement may also be used when determining what establishments to list. For example, a venue may be assigned a category (e.g., bar, grocery, park, restaurant, etc.). Physically proximate locations in the same category may then be supplied.

Figure 4:
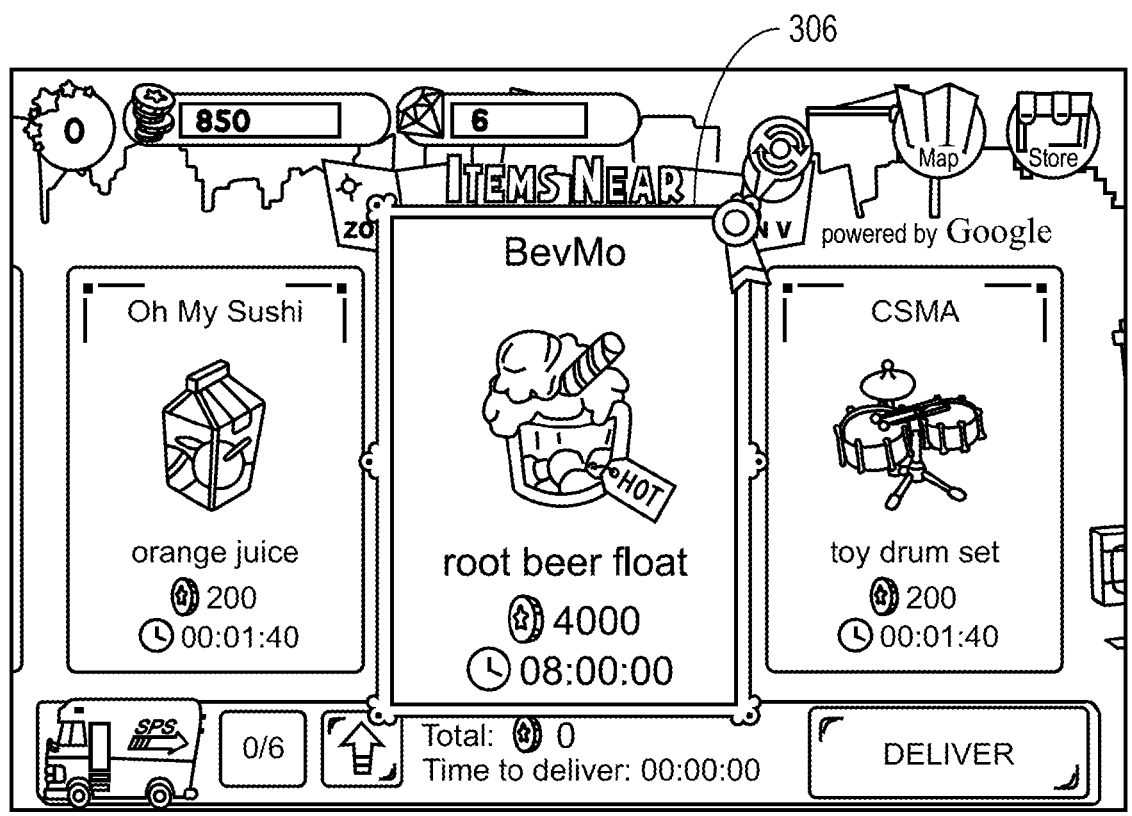

An icon 308 may be invoked to enter an in-game store where one can by virtual items. An icon 310 may be invoked to receive a map of a virtual environment, such as shown in FIG. 2. If establishment 306 is selected, it is highlighted, as shown in FIG. 4. The establishment is offering a virtual root beer float with an associated value of 4000 points for a physical check-in.

One aspect of the disclosed technology is the collection of resources from venues that one has not physically check-into. A player can "follow" another player. If A follows B, A is called a "follower" and B is called a "referrer" or simply a "friend". After a player obtains items through physical check-in, followers can get access to the same items. The exact metaphor of sharing is dependent on the game play of each game (e.g., in a shopping game, one visits a friend's shop to buy the items on display, whereas in a zombie game, one kills a friend to get the items off the dead body). The followers of a player can unlock the items collected when that player checks-in to a venue. This process is called porting.

There are several motivations for porting. Porting reduces the work associated with having to be physically present to check-in. It gives a player social incentive to check-in (e.g., to attract followers). The local merchant is a beneficiary because the players refer their followers to the virtual location corresponding to the actual location. A business may reward referrers virtual coins for this activity. The business can also be the referrer itself to boost its popularity in the game.

In one embodiment, players can earn check-in points, porting (or port) points and referral points, where check-in points are more valuable than port points, which are more valuable than referral points. Alternately, a single currency may be used, but different numbers of points are earned for check-in, porting and referring.

Physical check-in rewards may vary based upon specified criteria. For example, additional points may be supplied based upon distance (e.g., an out-of-town check-in), frequency (e.g., check-in N days in a row) and/or time of day.

Figure 5A:
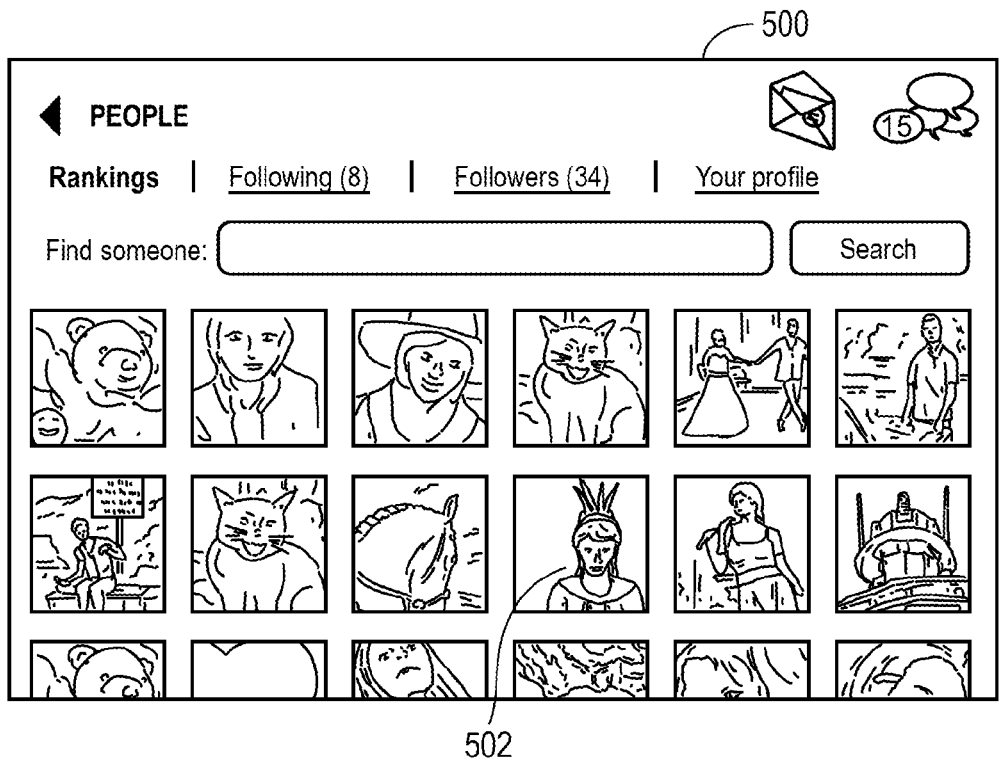
Figure 5B:
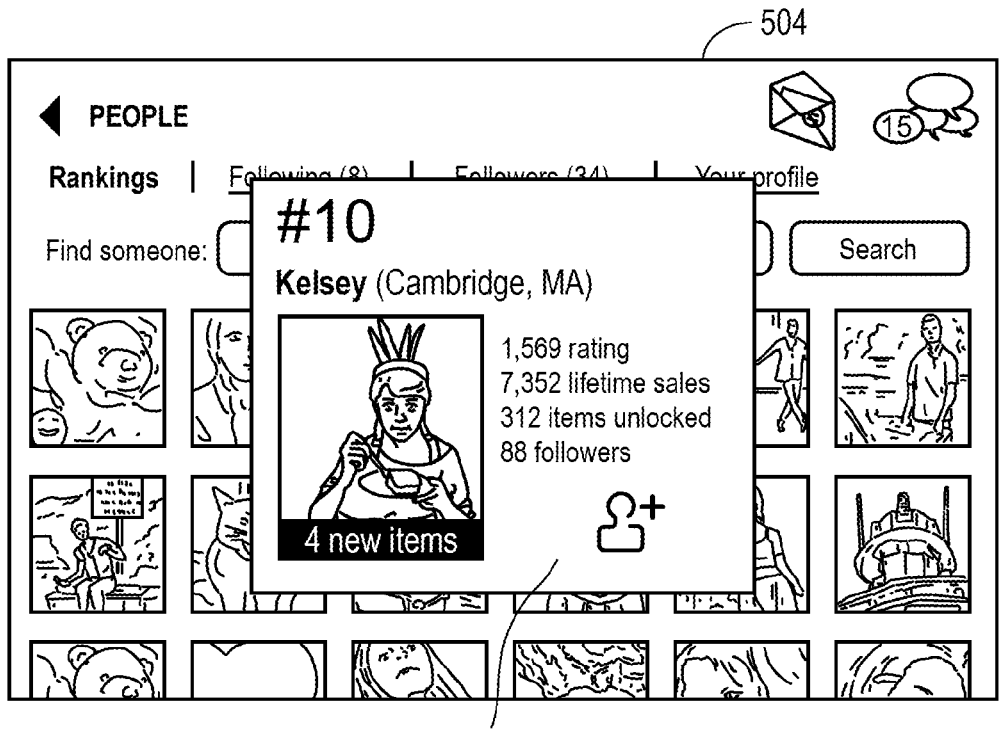

GUI 500 of FIG. 5 illustrates a listing of in-game followers 502. Selection of a follower results in GUI 504, which provides a block 506 that displays an in-game profile. The list of followers may be organized by popularity, preferences or other metrics. Popularity may be measured by the number of individuals in a player's social graph.

Figure 6:
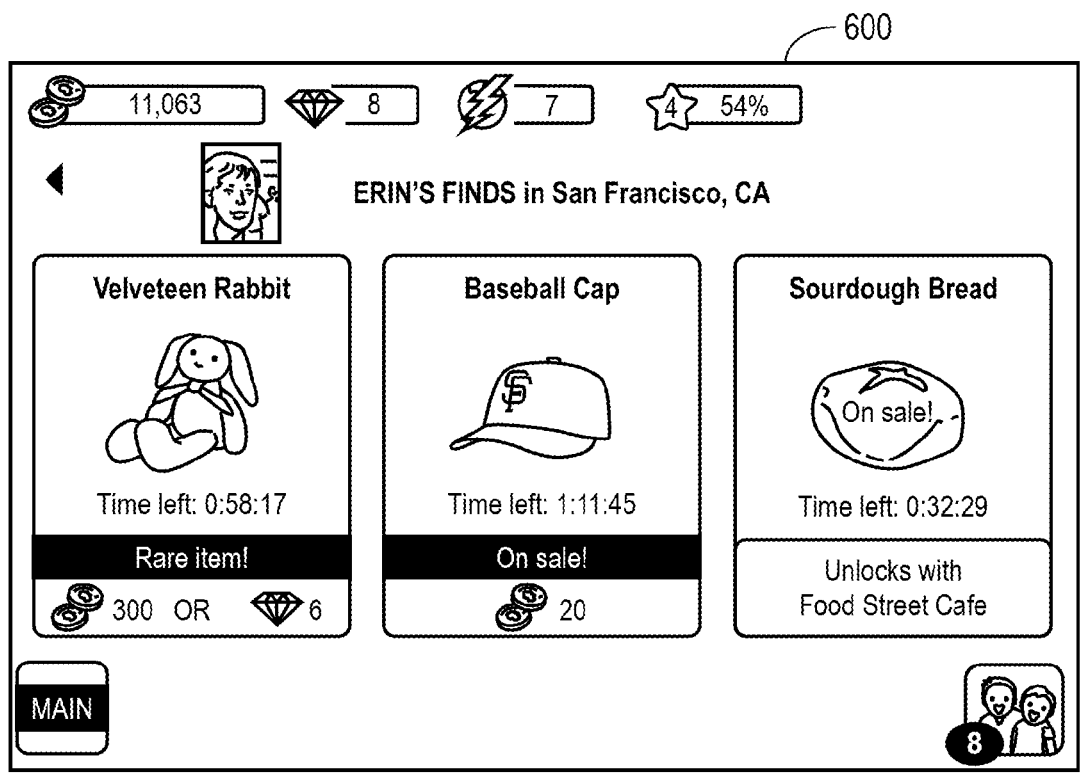
Figure 7:
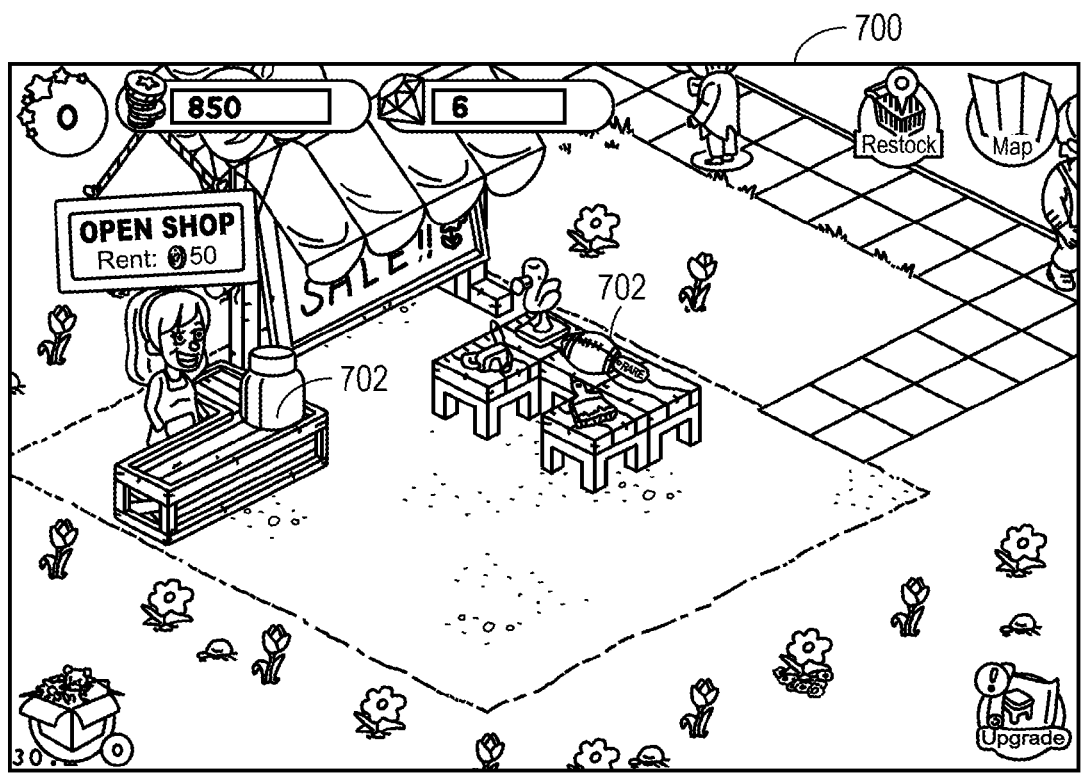
FIG. 7 illustrates a graphical user interface showing virtual items available for sale.

In one embodiment, selection of a user that a player is following results in a display of virtual items secured by that player through physical check-in. FIG. 6 shows a GUI 600 with a display of virtual items secured through physical check-in. These items may be shared. The price of the item may be determined by the in-game economy of the virtual item. For example, the in-game economy may be based upon stores where items may be purchased, such as shown in GUI 700 of FIG. 7. GUI 700 illustrates virtual items 702 available for sale. To regulate the in-game economy of virtual items, various algorithms may be used to determine the demand and supply for each item. For example, an item may be assigned to a category (e.g., bar, grocery, park, restaurant, etc.). An item can only be collected at places of the same category. Various parameters may be assigned to an item, such as scarcity (e.g., 0 to 100%), base price in virtual coins and supply generation.

The collected virtual items are used in virtual games. For example, players may sell collected items to simulated customers in a virtual storefront. Buy-low/sell-high action is used to make a profit. In one embodiment, in-game demand for items by simulated customers mirrors the actual demand of items by real players. If an item is viewed V times by the players and collected C times, then the "collect rate" is C/V, which represents actual player demand. Views of items may be measured by visits to a location where the items are hosted.

Virtual locations may be combined or splintered in accordance with embodiments of the invention. For example, when a game first launches, there may not be many players at a virtual location. To address this, several places in a common category may be coalesced into a single logical place. When users check-in or port to a place that doesn't have a sufficient number of players, one may randomly select one or more highly trafficked places in the same category and merge them with the original place into a logical place. The physical places in a logical unit do not have to be in proximity to each other.

When a game becomes popular, too many players may be contending for the same resources at a location. In this case, one may divide the resources into several copies. A group of similarly leveled players can play with each other on one copy of the resources.

The popularity issue may also be addressed by letting a user add virtual resources to a game. In one embodiment, a player can mark a location as an in-game virtual place and associate the location with GPS coordinates. The next time the player checks in to the location, it will be recognized as a virtual location in the game. Player designated locations tend to have special meanings to players. Such locations also tend to be frequently visited.

Players can organize themselves into teams. Two or more users of the same team can check-in or port to a place simultaneously in a group. Group ports may be provided special rewards.

Embodiments of the invention include privacy controls. For example, privacy settings may allow a player to specify whether they want to be followed by everyone in the game or just users from a real-life social network. A default setting anonymizes a player's check-in locations. The followers can only see the coarse location category when porting to a place. The players can opt-in to share the exact location of in-game followers or designated friends on a check-in basis.

An embodiment of the invention allows local merchants and businesses to advertise coupons and deals in a virtual game. For example, a merchant can sponsor a virtual item that is collected and played in the game. For example, a coffee shop may offer a virtual coffee mug to any user who buys a Latte. A referrer can earn referral points for each port. Merchants can reward referrers based on how many referral points they have earned. Merchants can target and offer group deals to a subset of players.

The configuration of server 102 is exemplary. It should be appreciated that the server 102 may be implemented in any number of configurations, such as with multiple central processing units. Further, the virtual game module 124 may be distributed across many machines. The check-in module 122 may be incorporated into the virtual game module 124 or may be a separate module, as shown. The configuration of the components of system 100 is insignificant; it is the operations of the disclosed technology, regardless of implementation, that is significant.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium embodying a set of instructions that, when executed by a processor, cause the processor to perform operations, the operations comprising:
   receiving an indication of a presence of a user at a physical location corresponding to a virtual location in a virtual game;
   determining a popularity score of the virtual location in the virtual game; and
   altering a popularity score of the user based upon the indication of the presence of the user at the physical location and the popularity score of the virtual location in the virtual game.

2. The non-transitory computer readable storage medium of claim 1, wherein the indication of the presence of the user at the physical location includes physical location coordinates from a mobile device.

3. The non-transitory computer readable storage medium of claim 1, the operations further including altering earned points for the user based on the receiving of the indication of the presence of the user at the physical location.

4. The non-transitory computer readable storage medium of claim 3, wherein the earned points include points for physical check-ins, port actions and referral actions awarded in different amounts based on predetermined relative values.

5. The non-transitory computer readable storage medium of claim 1, the operations further including providing a virtual object to the user based on the indication of the presence of the user at the physical location.

6. The non-transitory computer readable storage medium of claim 1, the operations further including altering a popularity score of the virtual location in the virtual game based upon the popularity score of the user.

7. The non-transitory computer readable storage medium of claim 5, the operations further including allowing a follower of the user to access the object without the follower providing an indication of a presence of the follower at the physical location.

8. The non-transitory computer readable storage medium of claim 1, the operations further including supplying a list of physically proximate establishments to the user that are configured to raise the popularity score of the user based on a visiting of the physically proximate establishments by the user.

9. The non-transitory computer readable storage medium of claim 8, the operations further including ordering the list in accordance with predetermined criteria selected from physical proximity, establishment popularity, establishment category and paid placement.

10. The non-transitory computer readable storage medium of claim 1, the operations further including assigning points for physical location indications in view of specified criteria selected from physical distance traveled by the user, frequency of a user at the physical location, popularity of the user, and time of day.

11. The non-transitory computer readable storage medium of claim 1, the operations further including forming a merged virtual location with merged virtual game participants based on a number of users at the physical location.

12. The non-transitory computer readable storage medium of claim 1, the operations further including splintering virtual locations with splintered virtual game participants based on a number of users at the physical location.

13. The non-transitory computer readable storage medium of claim 1, the operations further comprising accepting a user-specified physical location to create a corresponding user-specified virtual location in the virtual game.

14. The non-transitory computer readable storage medium of claim 1, the operations further including accepting requests to organize users into teams for purposes of porting at the physical location.

15. The non-transitory computer readable storage medium of claim 1, the operations further comprising receiving a specification of privacy controls from the user, the privacy controls specifying a level of anonymity associated with porting by the user at the physical location.

16. The non-transitory computer readable storage medium of claim 1, the operations further including allowing an entity associated with the physical location to provide virtual advertisements in the virtual game that encourage porting by the user at the physical location.

17. A system comprising:
one or more processors;
one or more modules implemented by the one or more processors and configured to:
  receive an indication of a presence of a user at a physical location corresponding to a virtual location in a virtual game;
  determine a popularity score of the virtual location in the virtual game; and
  alter a popularity score of the user based on the indication of the presence of the user at the physical location and the popularity score of the virtual location in the virtual game.

18. A method comprising:
receiving an indication of a presence of a user at a physical location corresponding to a virtual location in a virtual game;
determining a popularity score of the virtual location in the virtual game; and
altering a popularity score of the user based on the indication of the presence of the user at the physical location and the popularity score of the virtual location in the virtual game, the altering being implemented by one or more processors configured to perform the altering.

19. The method of claim 18, wherein the indication of the presence of the user at the physical location includes physical location coordinates from a mobile device.

20. The method of claim 18, further comprising altering earned points for the user based on the receiving of the indication of the presence of the user at the physical location.

* * * * *